US012189779B1

United States Patent
Reznik et al.

(10) Patent No.: US 12,189,779 B1
(45) Date of Patent: Jan. 7, 2025

(54) DETECTION OF CYBER THREATS EMBEDDED IN CLOUD APPLICATIONS

(71) Applicant: Wiz, Inc., New York, NY (US)

(72) Inventors: Roy Reznik, Tel Aviv (IL); Ami Luttwak, Binyamina (IL); Guy Rozendorn, Tel Aviv (IL); Yarin Miran, Rishon le Zion (IL)

(73) Assignee: Wiz, Inc., New York, NY (US)

( * ) Notice: Subject to any disclaimer, the term of this patent is extended or adjusted under 35 U.S.C. 154(b) by 107 days.

(21) Appl. No.: 17/164,650

(22) Filed: Feb. 1, 2021

(51) Int. Cl.
*G06F 21/57* (2013.01)
*G06F 8/75* (2018.01)
*H04L 9/32* (2006.01)

(52) U.S. Cl.
CPC ............. *G06F 21/577* (2013.01); *G06F 8/75* (2013.01); *H04L 9/3236* (2013.01); *G06F 2221/033* (2013.01)

(58) Field of Classification Search
CPC .... G06F 21/577; G06F 8/75; G06F 2221/033; H04L 9/3236
See application file for complete search history.

(56) References Cited

U.S. PATENT DOCUMENTS

| | | | | |
|---|---|---|---|---|
| 10,230,749 B1* | 3/2019 | Rostami-Hesarsorkh | ............ G06F 21/56 |
| 10,235,527 B1* | 3/2019 | Dalessio | ............ G06F 16/2379 |
| 10,685,115 B1* | 6/2020 | Lieberman | .......... H04L 63/1416 |
| 10,691,810 B1* | 6/2020 | Freitag | ............ G06F 8/71 |
| 11,537,400 B1* | 12/2022 | Zhang | ............ G06F 8/51 |
| 11,755,420 B2* | 9/2023 | Borate | ............ G06F 21/56 714/15 |
| 2009/0282393 A1* | 11/2009 | Costa | ............ G06F 21/54 717/134 |
| 2011/0225128 A1* | 9/2011 | Jarrett | ............ G06F 8/61 707/687 |
| 2012/0090025 A1* | 4/2012 | Milner | ............ G06F 21/564 726/22 |
| 2015/0356451 A1* | 12/2015 | Gupta | ............ G06F 21/552 706/46 |
| 2017/0109535 A1* | 4/2017 | Kozakura | ............ H04L 63/302 |
| 2018/0176262 A1* | 6/2018 | Kavi | ............ H04L 63/1408 |
| 2020/0065074 A1* | 2/2020 | Duan | ............ G06F 16/282 |

(Continued)

FOREIGN PATENT DOCUMENTS

DE 102008044808 * 1/2010

OTHER PUBLICATIONS

Duan et al. "Identifying Open-Source License Violation and 1-day Security Risk at Large Scale", 2017, CCS'17, Oct. 30-Nov. 3, 2017, Dallas, TX, USA; p. 2169-2185 (Year: 2017).*

*Primary Examiner* — David J Pearson
(74) *Attorney, Agent, or Firm* — M&B IP Analysts, LLC (57) ABSTRACT

A system and method for detection of cyber threats embedded in cloud applications are provided. The method includes inspecting a plurality of computing resources to detect code of at least one cloud application executed in a cloud environment; filtering the detected code to remove a portion of the code that is non-unique for the at least one cloud application; performing static analysis on the unique portion of the code to identify a mismatch between the unique portions of the code and its verified version stored in a code repository; and comparing each identified mismatch with at least a vulnerability tool, wherein a mismatch is a potential cyber threat embedded in the code.

21 Claims, 5 Drawing Sheets

(56) References Cited

U.S. PATENT DOCUMENTS

| | | | |
|---|---|---|---|
| 2020/0272670 A1* | 8/2020 | Vaishnavi | G06F 16/958 |
| 2020/0371782 A1* | 11/2020 | Baierlein | G06F 11/3608 |
| 2021/0263779 A1* | 8/2021 | Haghighat | G06F 21/78 |
| 2021/0266339 A1* | 8/2021 | Moshitzky | H04L 63/1441 |
| 2022/0277076 A1* | 9/2022 | Murphy | H04L 63/1425 |
| 2022/0311794 A1* | 9/2022 | Maya | G06F 11/0766 |

\* cited by examiner

DETECTION OF CYBER THREATS EMBEDDED IN CLOUD APPLICATIONS

TECHNICAL FIELD

The present disclosure relates generally to cybersecurity and, in particular, to systems and methods for detection of cyber threats embedded in cloud applications.

BACKGROUND

As companies and organizations transition to cloud computing platforms, many applications, including business and operation applications, are now executed in cloud computing platforms. In order to deploy and execute applications in cloud computing platforms, such applications need to comply with security, control, and manageability policies and governance.

Software applications are developed, tested and deployed using continuous integration and continuous delivery (CI/CD) tools. Such tools are primarily designed to enable the development lifecycle through a number of phases of a pipeline. The process for planning, creating, testing, and deploying a software application is referred to as a systems development lifecycle (SDLC) process.

Current SDLC processes and CI/CD tools are not designed to comply with the policies and governance of applications and services designed to be executed in the cloud. Specifically, applications requiring rapid developments, modifications, and challenges may fail to comply with security policies. For example, application updates are typically pushed on a daily basis, typically as updates. This means that one update may be in compliance, but an update pushed for the next date may not. As a result, cloud applications and services developed using the conventional SDLC processes and tools typically may not meet security requirements.

Further, an organization developing a software project consisting of many applications and programs may require multiple teams. Different teams may use different SDLC processes, including some processes with security checks and some without, therefore, resulting in unsecured software applications.

The inclusion of unsecure cloud applications means that the applications' code may be vulnerable. Code vulnerabilities create a potential risk of compromising security, allowing hackers to take advantage of the flawed code by tampering with the software, erasing data, extracting data, and the like. Code vulnerabilities make exist at any level of the application. That is, an operating system of a computing resource, source code (e.g., binary code), resource files (e.g., libraries), and the like, may all include various code vulnerabilities. It is estimated that currently three of every four applications suffer from code vulnerabilities.

In the related art, solutions related to detection of code vulnerabilities are based on integrating checks for vulnerabilities as part of the SDLC process. That is, one of the phases of code development would include scanning the code for vulnerabilities. Such solutions demonstrate a number of limitations that cannot improve the security of software applications, and, in particular, cloud applications. Specifically, scanning for vulnerabilities during the SDLC process does not allow scanning of already deployed applications. Further, every piece of code has to be verified during the SDLC process. However, typically, this is not the case, as projects, and operations, rely on dozens, hundreds, or thousands of software packages, including different versions of the same package, packages developed within the organization, and packages developed by parties outside the organization. Not all teams of organizations and/or teams may comply with the vulnerability scanning as part of their process.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for detection of cyber threats embedded in cloud applications. The method comprises inspecting a plurality of computing resources to detect code of at least one cloud application executed in a cloud environment; filtering the detected code to remove a portion of the code that is non-unique for the at least one cloud application; performing static analysis on the unique portion of the code to identify a mismatch between the unique portions of the code and its verified version stored in a code repository; and comparing each identified mismatch with at least a vulnerability tool, wherein a mismatch is a potential cyber threat embedded in the code.

Certain embodiments disclosed herein also include a non-transitory computer readable medium having stored thereon instructions for causing a processing circuitry to execute a process for detection of cyber threats embedded in cloud applications, the process comprising: inspecting a plurality of computing resources to detect code of at least one cloud application executed in a cloud environment; filtering the detected code to remove a portion of the code that is non-unique for the at least one cloud application; performing static analysis on the unique portion of the code to identify a mismatch between the unique portions of the code and its verified version stored in a code repository; and comparing each identified mismatch with at least a vulnerability tool, wherein a mismatch is a potential cyber threat embedded in the code.

In addition, certain embodiments disclosed herein include a system for detection of cyber threats embedded in cloud applications. The system comprises: a processing circuitry; and a memory, the memory containing instructions that, when executed by the processing circuitry, configure the system to: inspect a plurality of computing resources to detect code of at least one cloud application executed in a cloud environment; filter the detected code to remove a portion of the code that is non-unique for the at least one cloud application; perform static analysis on the unique portion of the code to identify a mismatch between the unique portions of the code and its verified version stored in a code repository; and compare each identified mismatch with at least a vulnerability tool, wherein a mismatch is a potential cyber threat embedded in the code.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
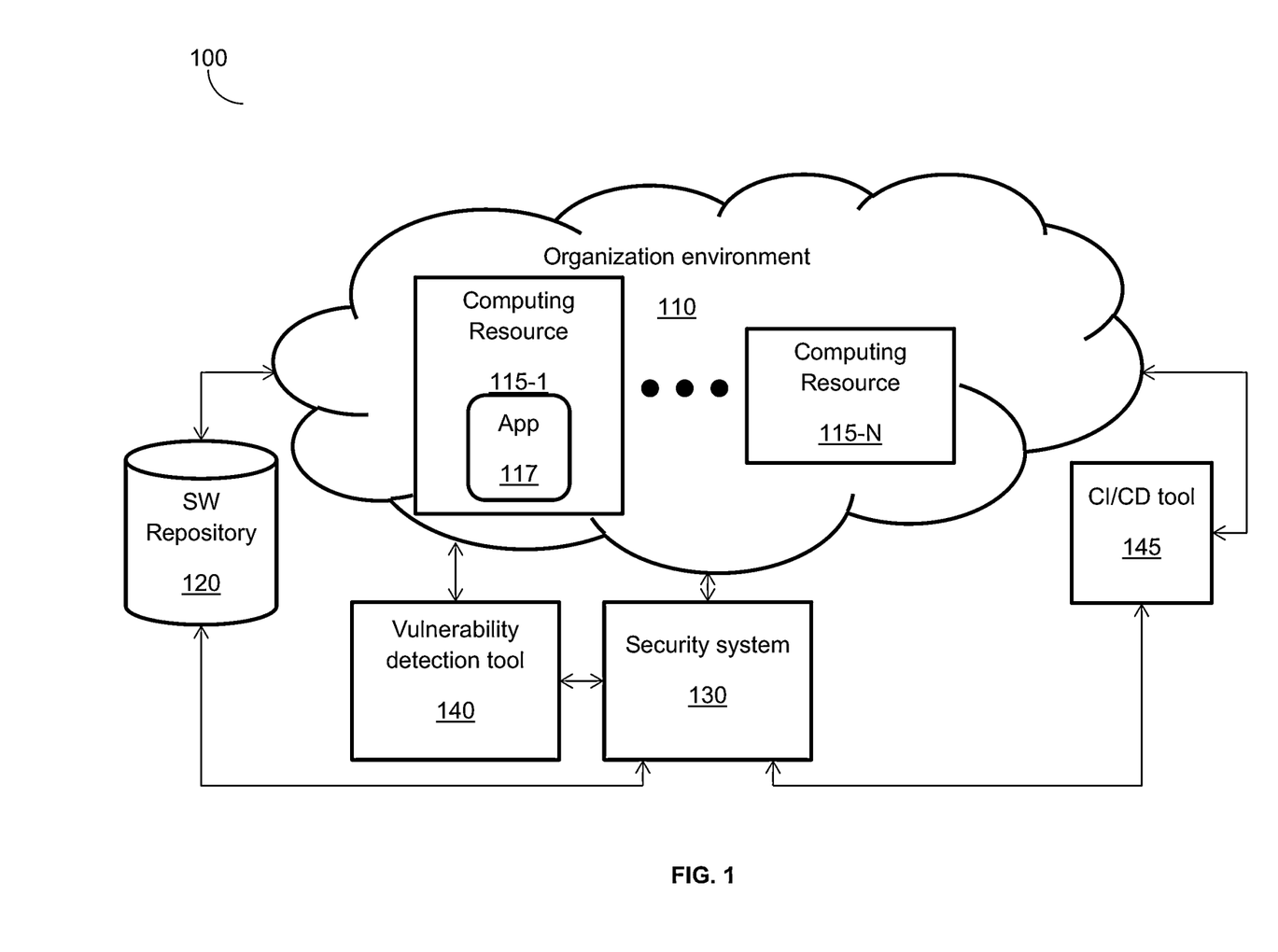
FIG. 1 is a diagram of an organization environment utilized to describe the various embodiments.

FIG. 1 is an example diagram 100 of an organization environment 110 utilized to describe the various embodiments. The diagram 100 depicts an organization environment 110, including multiple computing resources, 115-1 through 115-n (hereinafter, "computing resources" 115 or "computing resource" 115). Further, the diagram includes an organization software (SW) repository 120, a security system 130 (hereinafter "system" 130), a vulnerability detection tool 140, and a continuous improvement and continuous development (CI/CD) tool 145.

As is applicable to the computing resources 115, "n" is an integer having a value greater than or equal to two. It may be understood that, while a single configuration of an organization environment 110, and its related elements, is shown for purposes of simplicity, an organization environment 110 may include, and be variously connected to, various components, devices, systems, and the like, such as those included in the diagram 100, as well as any combination thereof, without loss of generality or departure from the scope of the disclosure.

Further, it may be similarly understood that multiple organization environments 110, as well as other, similar components, devices, systems, and the like, such as those included in the diagram 100, may be simultaneously relevant to the processes and features described herein, including, without limitation, multiple interconnected organization environments 110, other, like, configurations, and any combination thereof, without loss of generality or departure from the scope of the disclosure.

In an embodiment, the organization environment 110 is a cloud environment, or the like. The cloud environment may include a private cloud, a public cloud, a hybrid cloud, and the like, as well as various combinations thereof.

Examples of commercially-available public cloud platforms or environments, provided on a service basis, include, as examples and without limitation, Amazon AWS®, Microsoft Azure®, Google® Cloud Platform, and the like.

The organization environment 110 may include a plurality of computing resources 115. Computing resources 115 may be objects, systems, devices, components, applications, entities, and the like, configured to operate within the organization environment 110 and provide various functionalities therein by executing code of cloud applications. The computing resources 115 may be configured to connect with various other computing resources 115.

The computing resources 115 may be configured as physical components, devices, systems, and the like, as virtual components, devices, systems, and the like, or as hybrid physical-virtual components, devices, systems, and the like. Examples of computing resources 115 include, without limitation, virtual machines (VMs), user devices, dedicated processing systems, databases, servers, virtual networks, firewalls, network interface cards, proxies, gateways, containers, container management objects, subnets, hubs, virtual private networks (VPNs), and the like, as well as any combination thereof.

The computing resources 115 may be configured to run, host, store, or otherwise include one or more data features, processes, services, and the like, which may be relevant to one or more cloud applications (apps) 117. The applications 117, as may be hosted, executed, and the like, as well as any combination thereof, in, by, or on one or more computing resources 115, are services, processes, and the like, configured to provide one or more functionalities by execution of various commands and instructions. The applications 117 may interact or communicate with other resources 115, applications 117, and other, like features, including those resources 115, applications 117, and the like deployed in separate networks, cloud environments, and the like, as well as any combination thereof. It should be understood that a single application 117, including the same application 117, may be both present and executed in multiple resources 115, including multiple resources 115 of the same environment 110, without loss of generality or departure from the scope of the disclosure.

The organization environment 110 may be configured to connect to one or more software repositories 120. A software repository 120 is a storage location for software packages. A software repository 120 may include a table of contents, software data, metadata, and the like, as well as any combination thereof. A software repository 120 may be configured to store software packages, artifacts, and the like, as well as any combination thereof. A software repository may provide additional functionalities including, without limitation, access control, versioning, security checks for uploaded software, cluster functionality, and the like, as well as any combination thereof.

Artifacts are outputs or collections of files, and may contain metadata. A software package is a single archive file in a well-defined format that contains files appropriate for the package type. A software package may be a library or an application, and may include one or more codebases, resource files, commit histories, authorization settings, and the like, as well as any combination thereof.

The vulnerability detection tool 140 is configured to identify known vulnerabilities by comparison of code with vulnerability databases. The vulnerability detection tool 140, in an embodiment, is used to scan only third-party code, i.e., code developed outside of the organization. The vulnerability detection tool 140 may be configured to connect to the organization environment 110 and the security system 130.

The CI/CD tool 145 is a component, device, system, process, service, or the like, configured to provide one or more CI/CD functionalities including, without limitation, version control, commit management, other, like, functionalities, and any combination thereof. The CI/CD tool 145 may be configured to connect to the organization environment 110, the security system 130, and the like, as well as any combination thereof, via one or more connections.

The security system 130 is configured to provide one or more static analysis functionalities including, without limitation, production code static analysis, and the like, as well as any combination thereof. The security system 130 may be configured to execute one or more instructions, methods, processes, and the like, including, without limitation, the processes described with respect to FIGS. 2 and 4, other, like, processes, and any combination thereof.

The security system 130 may be configured as a physical system, device, or component, as a virtual system, device, or component, or as a hybrid physical-virtual configuration. A detailed description of a security system, 130, according to an embodiment, is provided with respect to FIG. 5, below. It may be understood that, while the security system 130 is depicted in FIG. 1 as a discrete element external to the organization environment, the security system 130 may be included within any of the various elements of the organization environment 110, including the various subparts thereof, without loss of generality or departure from the scope of the disclosure.

The security system 130 may be configured to connect to the organization environment 110, and to any computing resources included therein, as well as to software repositories 120, the vulnerability detection tool 140, a CI/CD tool 145, and the like, as well as any combination thereof.

According to the disclosed embodiments, the security system 130 is configured to inspect any cloud application executed by computing resource(s) for cyber threats. In an embodiment, such inspection includes utilizing static analysis techniques, such as by, for example, inspecting the code of a cloud application without executing the application. In an embodiment, the security system 130 is also configured to utilize the vulnerability detection tool 140 to search for known vulnerabilities in third-party code modules (libraries). The operation of the system 130 is further discussed hereinbelow.

Figure 2:
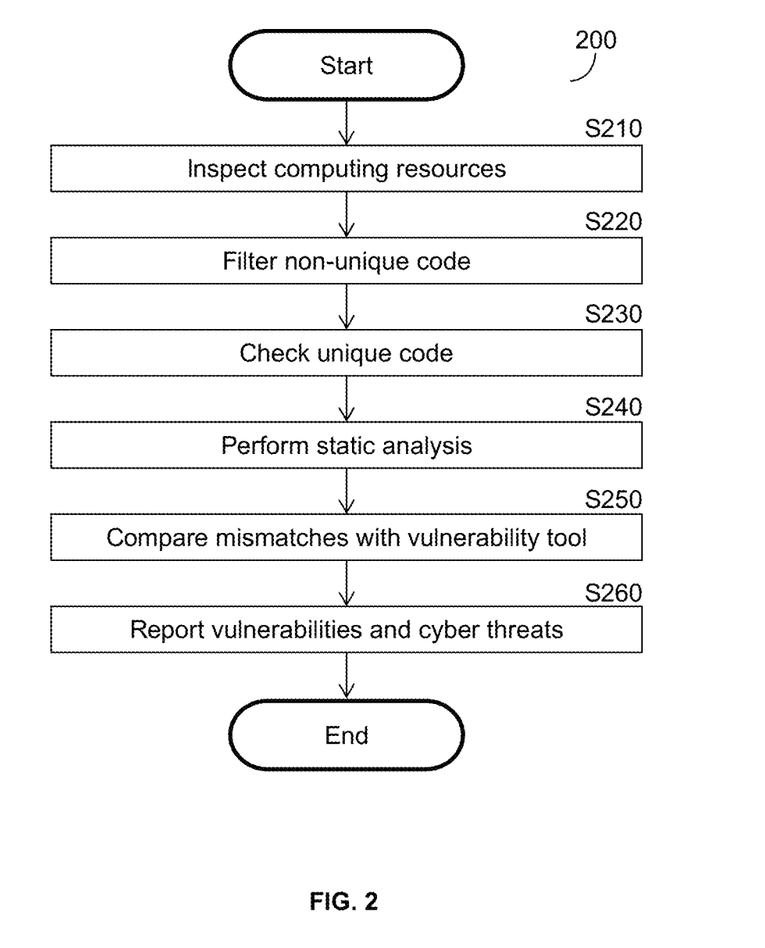
FIG. 2 is a flowchart depicting a method for detection of cyber threats embedded in cloud applications, according to an embodiment.

FIG. 2 is an example flowchart 200 depicting a method for detection of cyber threats embedded in cloud applications, according to an embodiment.

At S210, computing resources in an organization environment are inspected to detect cloud applications executed thereon. The cloud applications are stored on disks or any storage medium of a computing resource. In an embodiment, inspection of computing resources at S210 may include, without limitation, detection of code modules, files, software packages, artifacts, code resources, and the like, as well as any combination thereof. The detected code may be in formats including, without limitation code binaries, executables, high-level programming languages, and the like, as well as any combination of thereof.

Figure 3:
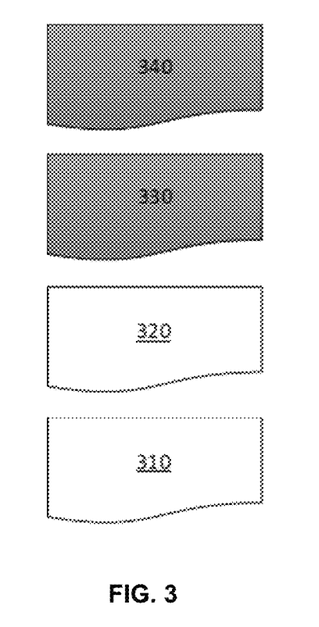
FIG. 3 is a schematic illustration of various code modules, according to an embodiment.

As schematically illustrated in FIG. 3, which is as schematic illustration of various code modules, according to an embodiment, a software package of a cloud application executed by a computing resource may include a number of code modules, such as OS packages 310, third-party code libraries 320, unique application libraries 330, and unique application code 340. Software code or code modules may include one or more programs, procedures, functions, methods, classes, and the like. The code may be source code files, code binaries, compiled code, and the like, as well as any combination thereof. The libraries 320 and 330 may be stored in a software repository (e.g., the repository 120). It may be understood that each code module may be associated with metadata data features including, without limitation, data feature locations, data feature addresses, data feature authors, data feature creation and modification dates, data feature permissions and restrictions, and the like, as well as any combination thereof.

Returning to FIG. 2, at S220, non-unique code is filtered out. Non-unique code may include, without limiting the scope of the disclosed embodiments, OS packages 310 and third-party code libraries 320, as shown in FIG. 3 below. Non-unique code may be identified and filtered by one or more analyses including, without limitation, identification of code detected, such as at S210, at one or more pre-defined or known locations or addresses, such as filesystem locations specific to operating system files, code including one or more data features or metadata data features indicating the code as non-unique, such as signatures, authors, and the like, other, like, analyses, and any combination thereof.

In addition, filtering at S220 may include application of various noise-reduction processes. Noise reduction processes are processes configured to, as examples and without limitation, remove, or otherwise hide, dormant modules, such as modules which are not frequently or recently accessed or updated, other, like, processes, and any combination thereof.

At S230, the non-unique code is checked for known vulnerabilities. In an embodiment, S230 is performed using the vulnerability detection tool 140 or by comparison with a database (e.g., CVE®) which includes known vulnerabilities. Such checking may include extracting an identifier (e.g., any of the name, version, release date, and other properties, and combinations thereof) of each of non-unique code module, and querying a vulnerability detection tool 140 or a vulnerability database using identifier. For example, an execution code overflow was reported in the Windows® 10 operating system on Oct. 10, 2020.

At S240, a static analysis of the unique code is performed to detect cyber threats embedded in the unique portions of the code. Unique code may include, without limiting the scope of the disclosed embodiments, unique application libraries 330, and unique application code 340, shown in FIG. 3. Unique code may be checked, using static analysis, to determine one or more code status descriptions including, without limitation, code authors, code locations, code deployment status, code vulnerability status, code build or revision number or version, other, like, descriptions, and any combination thereof.

In an embodiment, unique code may be checked by comparison of code hashes with code hashes stored in software repositories. To examine the retrieved current version of the code associated with the unique code being, a CI/CD tool, such as the CI/CD tool, 145, of FIG. 1 may be queried. Access to such tools may be achieved via a dedicated application programming interface (API). Further, where checking of unique code at S240 includes the checking of one or more code, such as, as examples and without limitation, code binaries, source code, compiled applications or executables, resource files, and the like, which do not match data features included in the sources described, one or more mismatches may be indicated, where such mismatches may be compared with a vulnerability tool, such as at S250, below.

Where static analysis at S240 includes the comparison of code hashes with hashes stored in software repositories, such comparison may include the identification of one or more mismatches. Mismatches are discrepancies between unique code and corresponding versions of the same code stored in the described software repositories. Mismatches may indicate one or more differences between code versions, including differences which may indicate vulnerabilities, cyber threats, and the like. Mismatches may be identified where a comparison of code hashes with hashes stored in a software repository indicates a difference between such hashes, providing for identification of unique code which does not match a verified version stored in a repository.

As an example, static analysis of a software package including code and resource files relevant to a shipping label generation program, as stored and executed by a sample VM, may include hashing of such a software package. Where, according to the same example, the hash of the software package included in the VM does not match a hash of a verified version of the same software package, as included in a software repository, a mismatch may be identified.

At S250, mismatches are compared with a vulnerability tool to determine whether the mismatch represents a cyber threat. Comparison of mismatches at S250 may include the analysis of one or more code portions via such a tool, including, without limitation, comparison of unique code determined, at S240, not to match the contents of one or more sources of code information, such as those described, where such mismatches may indicate code vulnerabilities. Comparison at S250 may include, without limitation, comparison of code, or hashes thereof, with data features, or hashes thereof, included in various external or internal code vulnerability databases, repositories, and the like, dependency analysis, such as determination of whether code portion, when executed, references a data feature external to a code package or library, where such a reference could include a vulnerability, code network analysis, such as determination of whether a given code portion, when executed, causes a vulnerability by action over a network, such as by connecting to the internet via an unsecured method, and the like, as well as any combination thereof. Comparison at S250 may further include labeling, tagging, or otherwise associating one or more data features with various code vulnerability status descriptors, and the like.

At S260, any vulnerability and cyber threat detected in the non-unique code, unique code, and mismatches are reported. In a further embodiment, the reported vulnerabilities and/or cyber threats are ordered according to their severity.

Figure 4:
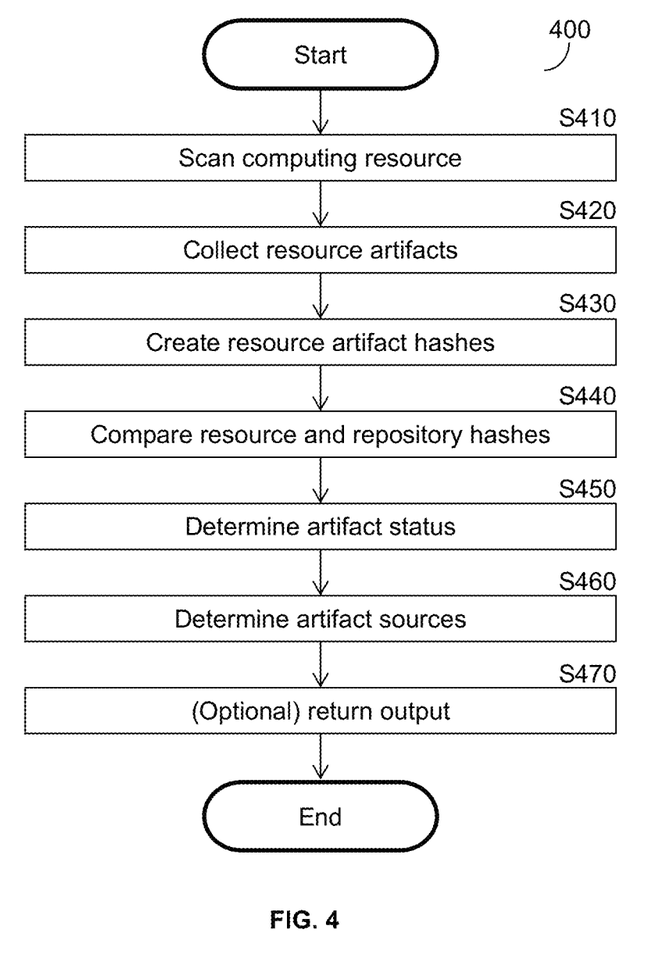
FIG. 4 is a flowchart depicting a method for artifact analysis, according to an embodiment.

FIG. 4 is an example flowchart 400 depicting a method for artifact analysis, according to an embodiment.

At S410, a computing resource is scanned. A computing resource is a resource similar or identical to those resources described with respect to FIG. 1, above. As described with respect to FIG. 1, above, a computing resource may include one or more components, including components configured to provide functionalities including, without limitation, data storage, data processing, data transmission, and the like, as well as any combination thereof, where such components may be, as examples and without limitation, memory components, storage components, processing components, network interface components, and the like, as well as any combination thereof. Scanning, as executed at S410, may include, without limitation, identification of data features included in any of the components of the resource, including, without limitation, encrypted data features, compressed data features, data at rest, data in motion, and the like, as well as duplication of such data features, collection of relevant metadata, and the like, as well as any combination thereof. Further, scanning at S410 may include identification of one or more resource artifacts, and the like, such as are described herein.

At S420, resource artifacts are collected. An artifact, as may be collected at S420, is a data feature generated by, or relevant to, the execution of a program, executable function, or other, like, software feature. Artifacts may include, as examples and without limitation, memory allocations, program outputs, resource calls, executed program versions, and the like, as well as any combination thereof. As an example, execution of a compiled executable file, such as a program for generating mailing labels, may include the generation of artifacts such as, without limitation, designated allocated memory blocks, mailing label print queues, requests to access a separate mailing address database, as well as other, like, data features, and any combination thereof.

Collection of artifacts at S420 may include collection of data features relevant to artifacts identified at S410, in addition to relevant metadata. Collection at S420 may include copying identified data features to a secondary, analytic memory or storage for subsequent analysis.

At S430, resource artifacts are hashed. Hashing of artifacts at S430 may include generation of one or more hash files (also referred to herein as "hashes") for the various data features collected at S420. Hash files, as may be generated at S430, are low-file-size encoded representations of larger-file-size data features, such as may be relevant to, or included in, the various collected artifacts. Hash files may be generated at S430 by application of one or more techniques including, without limitation, application of one or more standard or known hashing functions, application of one or more custom hashing functions, other, like, methods, and any combination thereof. Generation of hash files at S430 may include generation of hash files for each individual data feature collected at S420, generation of hash files for collections of data features, such as hashing of groups of artifacts, and the like, as well as any combination thereof.

At S440, resource artifact hashes are compared with repository hashes. Repository hashes are hash files generated for one or more data features, including artifacts, and the like, where such repository hashes are included in various repositories, such as the repository, 120, of FIG. 1, above, where such repository hashes may be generated by one or more means, including by application of hashing techniques similar or identical to those described with respect to FIG. S430, above. Repository hashes may be generated according to one or more bases including, without limitation, pre-generation, such as may be the case for a repository configured to hash each data feature upon addition to the repository and to store such hashes, generation upon request, such as ay be the case for a repository configured to generate data features on demand, as well as other, like, bases, and any combination thereof.

Comparison of artifact hashes, as are generated at S430, with the described repository hashes may include detection of one or more matches between the generated hashes and the repository hashes. Matches between the generated and repository hashes may be detected by, for example, comparison of a first artifact hash with, comparison of a single repository hash with various artifact hashes. The hash values of artifacts may be stored in various repository hashes included in a dictionary, database, or other, like, collection of such repository hashes.

Further, comparison at S440 may be executed on a selective basis, such as by comparison of a single, specified, artifact hash with a single, specified, repository hash, comparison of selected groups of artifact hashes with selected groups of repository hashes, other, like, selective comparisons, and any combination thereof. Where a match between an artifact hash and a repository hash is detected at S440, the matching hashes may be configured to include one or more descriptions of such a match, such as by associating a matching hash with a data label, tag, or other feature indicating detection of a match.

At S450, artifact statuses are determined. Artifact statuses are data labels, tags, and other, like, descriptors which indicate the status of a given artifact. Artifact statuses may include indications of, as examples and without limitation, whether a package is an internal or external package, which security tools, and versions thereof, are relevant to, or included in, the given artifacts, results of applications of such security tools to the given artifacts, whether the given artifacts include any known vulnerabilities, the identities of such known vulnerabilities, whether any known tests are relevant to the given artifacts, whether an artifact is "of interest" or "not of interest," as well as other, like, descriptions and indications, and any combination thereof. Statuses may be determined based on the results of one or more comparisons, as may be executed at S440. Determination of artifact statuses at S450 may include, without limitation, correlation of various artifact hashes with repository hashes, such as in a manner similar or identical to that of S450, collection of relevant statuses for repository artifacts corresponding with repository hashes which match the compared artifact hashes, other, like, methods, and any combination thereof. Further, artifact statuses, as well as artifact sources, as determined at S460, may be subsequently applicable to the identification or determination of one or more cyber threats, vulnerabilities, or the like.

At S460, artifact sources are determined. Artifact sources describe a package version commit which, when applied or executed, provides for the generation of one or more given artifacts, where a version commit describes the inclusion of a specific version of a package in a given repository. Artifact sources may be determined by comparison of artifact data feature hashes, such as are generated at S430, with one or more repository artifact hashes, as described hereinabove, according to one or more comparisons, such as comparisons similar or identical to those comparisons described hereinabove. Specifically, artifact sources may be determined by comparing hashed network object artifact data features with hashed repository artifact data features, identifying artifact data feature hash matches, and identifying, in the repository, the package version which, when applied or executed, provides for the generation of the given repository artifact data features. Further, artifact sources, as well as artifact statuses, as determined at S450, may be subsequently applicable to the identification or determination of one or more cyber threats, vulnerabilities, or the like.

As an example, execution of a shipping label generation program, developed within an organization, on a computing resource, such as a computer terminal, may require the allocation of a block of memory of a given size and including specific memory addresses described in the program. According to the same example, the source of the memory block artifact may be determined by comparing a hash of the artifact, generated within the network object by a program version also included therein, with memory block artifact hashes included in the organization's internal repository. Where a matching memory block artifact hash is identified within the organization's internal repository, the repository package version which, by application or execution, provides for the generation of the repository memory block artifact may be identified as the object source.

It may be understood that S460 may be executed at any point following the execution of S440, including before, or simultaneously with, S450, without loss of generality or departure from the scope of the disclosure.

At the optional S470, one or more outputs are returned. Outputs are reports, presentations, displays, and the like, configured to provide for description of various data features relevant to the production code static analysis, such data features including, without limitation, descriptions of resources scanned at S410, descriptions of resource artifacts collected at S420, relevant resource artifact hashes, as generated at S430, resource and repository comparison results, as generated at S440, artifact statuses, as determined at S450, artifact sources, as determined at S460, and the like, as well as any combination thereof. Outputs may be returned in one or more formats including, without limitation, as on-screen displays, such as may be presented through smartphones, computer terminals, and the like, as print-outs or other, like, presentations, other, like, formats, and any combination thereof.

Figure 5:
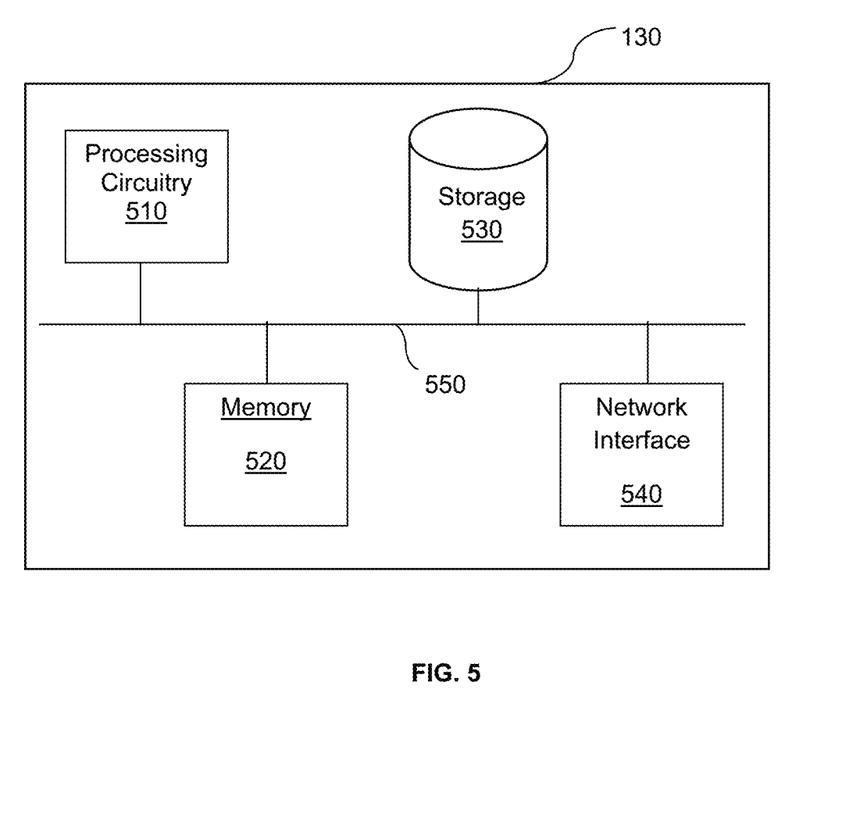
FIG. 5 is a hardware block diagram depicting a security system, according to an embodiment.

FIG. 5 is an example hardware block diagram 500 depicting a security system 130, according to an embodiment. The security system 130 includes a processing circuitry 510 coupled to a memory 520, a storage 530, and a network interface 540. In an embodiment, the components of the security system 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the security system 130 to communicate with the various components, devices, and systems described herein for detection of cyber threats embedded in cloud applications, as well as other, like, purposes.

It should be understood that the embodiments described herein are not limited to the specific architecture illustrated in FIG. 5, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detection of cyber threats embedded in cloud applications, comprising:

detecting code of at least one cloud application that is for execution in a cloud amongst a plurality computing resources in a cloud environment;

filtering the detected code to remove a portion of the code that is non-unique for the at least one cloud application;

performing a static analysis on each unique portion of the code to identify a mismatch between any unique portion of the code and its corresponding verified version stored in a code repository; and detecting a potential cyber threat embedded in the code based on a comparison of each identified mismatch with one or more data features using at least a vulnerability tool.

2. The method of claim 1, further comprising:
reporting each identified potential cyber threat.

3. The method of claim 1, further comprising:
comparing the non-unique code portions to a vulnerability database to determine if the non-unique portion of the code contains known vulnerabilities.

4. The method of claim 1, wherein the non-unique portion of the code includes at least one of: an operating system (OS) package data feature and a third-party code library data feature.

5. The method of claim 1, wherein identifying the mismatch between the unique portion of the code and its verified version stored in the code repository further comprises:
comparing hash values of the unique portion of the code to hash values of its verified version.

6. The method of claim 1 wherein the code includes any one of: binary code, executable code, and high-level programming language code.

7. The method of claim 1, wherein the code includes artifacts, and wherein the method further comprises scanning the artifacts for cyber threats.

8. The method of claim 1, further comprising:
creating a resource artifact hash for a resource artifact included in the code, wherein the resource artifact hash is a low-file-size representation of the resource artifact; and
comparing the resource artifact hash with at least one repository hash, wherein each of the at least one repository hash is a low-file-size representation of an artifact included in a repository.

9. The method of claim 8, further comprising:
determining an artifact status of the resource artifact, wherein the artifact status of the resource artifact is a descriptor indicating a status of the resource artifact; and
determining an artifact source of the resource artifact, wherein each artifact source is at least a version of a software package, wherein the at least a version of the software package, when executed, generates the resource artifact.

10. The method of claim 9, further comprising:
determining if the resource artifact contains at least one vulnerability based on the artifact status and the artifact source.

11. A non-transitory computer readable medium having stored thereon instructions for causing a processing circuitry to execute a process for detection of cyber threats embedded in cloud applications, the process comprising:
detecting code of at least one cloud application that is for execution in a cloud amongst a plurality computing resources in a cloud environment;
filtering the detected code to remove a portion of the code that is non-unique for the at least one cloud application;

performing a static analysis on each unique portion of the code to identify a mismatch between any unique portion of the code and its corresponding verified version stored in a code repository; and detecting a potential cyber threat embedded in the code based on a comparison of each identified mismatch with one or more data features using at least a vulnerability tool.

12. A system for detection of cyber threats embedded in cloud applications, comprising:

a processing circuitry; and a memory, the memory containing instructions that, when executed by the processing circuitry, configure the system to:

detect code of at least one cloud application that is for execution in a cloud amongst a plurality computing resources in a cloud environment;

filter the detected code to remove a portion of the code that is non-unique for the at least one cloud application;

perform a static analysis on each unique portion of the code to identify a mismatch between any unique portion of the code and its corresponding verified version stored in a code repository; and detect a potential cyber threat embedded in the code based on a comparison of each identified mismatch with one or more data features using at least a vulnerability tool.

13. The system of claim 12, wherein the system is further configured to:

report each identified potential cyber threat.

14. The system of claim 12, wherein the system is further configured to:

compare the non-unique code portions to a vulnerability database to determine if the non-unique portion of the code contains known vulnerabilities.

15. The system of claim 12, wherein the non-unique portion includes at least one of: an operating system (OS) package data feature and a third-party code library data feature.

16. The system of claim 12, wherein the system is further configured to:

compare hash values of the unique portion of the code to hash values of its verified version.

17. The system of claim 12, wherein the code includes any one of: binary code, executable code, and high-level programming language code.

18. The system of claim 12, wherein the code includes artifacts, and wherein the method further comprises scanning the artifacts for cyber threats.

19. The system of claim 18, wherein the system is further configured to:

create a resource artifact hash for a resource artifact included in the code, wherein the resource artifact hash is a low-file-size representation of the resource artifact; and compare the resource artifact hash with at least one repository hash, wherein each of the at least one repository hash is a low-file-size representation of an artifact included in a repository.

20. The system of claim 19, wherein the system is further configured to:

determine an artifact status of the resource artifact, wherein the artifact status of the resource artifact is a descriptor indicating a status of the resource artifact; and determine an artifact source of the resource artifact, wherein each artifact source is at least a version of a software package, wherein the at least a version of the software package, when executed, generates the resource artifact.

21. The system of claim 20, wherein the system is further configured to:

determine if the resource artifact contains vulnerabilities based on the artifact status and the artifact source.

* * * * *